US012734532B1

(12) United States Patent
Mee

(10) Patent No.: US 12,734,532 B1
(45) Date of Patent: Sep. 15, 2026

(54) PORTABLE PARTICLE SPRAYER

(71) Applicant: Thomas R. Mee, Irwindale, CA (US)

(72) Inventor: Thomas R. Mee, Irwindale, CA (US)

( * ) Notice: Subject to any disclaimer, the term of this patent is extended or adjusted under 35 U.S.C. 154(b) by 1063 days.

(21) Appl. No.: 17/478,633

(22) Filed: Sep. 17, 2021

Related U.S. Application Data

(60) Provisional application No. 63/079,988, filed on Sep. 17, 2020.

(51) Int. Cl.

| | |
|---|---|
| ***B05B 1/02*** | (2006.01) |
| ***B05B 1/14*** | (2006.01) |
| ***B05B 1/34*** | (2006.01) |
| ***B05B 9/00*** | (2006.01) |
| ***B05B 9/04*** | (2006.01) |

(52) U.S. Cl.
CPC .................. *B05B 1/02* (2013.01); *B05B 1/14* (2013.01); *B05B 1/3405* (2013.01); *B05B 9/007* (2013.01); *B05B 9/0403* (2013.01)

(58) Field of Classification Search
CPC ........... B05B 1/02; B05B 1/14; B05B 1/3405; B05B 9/007; B05B 9/0403
USPC ....... 239/146, 525, 526, 548, 556, 557, 518, 239/521, 152–154, 587.1, 588, 536, 524
See application file for complete search history.

(56) References Cited

U.S. PATENT DOCUMENTS

| | | | | | |
|---|---|---|---|---|---|
| 1,976,340 | A * | 10/1934 | Gretschel | A01M 7/005 | 239/536 |
| 3,894,691 | A * | 7/1975 | Mee | A01G 13/065 | 239/524 |
| 5,533,671 | A * | 7/1996 | Baer | B08B 3/026 | 239/373 |
| 5,620,142 | A * | 4/1997 | Elkas | B05B 1/00 | 239/596 |
| 5,935,657 | A * | 8/1999 | Melendez | B05B 13/04 | 239/281 |
| 6,942,735 | B2 * | 9/2005 | Rich | E04D 15/07 | 239/550 |
| 6,983,899 | B2 * | 1/2006 | Melendez | B05B 1/202 | 239/548 |
| 7,140,325 | B2 * | 11/2006 | Lowe | A01K 13/003 | 239/550 |
| 2009/0241410 | A1 * | 10/2009 | Baird, III | A01M 29/34 | 239/602 |
| 2015/0283575 | A1 * | 10/2015 | Miller | B05C 17/00589 | 239/548 |
| 2021/0037806 | A1 * | 2/2021 | Wells | F04B 53/101 | |

* cited by examiner

*Primary Examiner* — Steven J Ganey
(74) *Attorney, Agent, or Firm* — LOZA & LOZA, LLP; Stephen D. Burbach

(57) ABSTRACT

The disclosure relates in some aspects to a portable multi-nozzle particle sprayer. In some examples, the particle sprayer may include a relatively small manifold with multiple atomization nozzles (e.g., fog nozzles) that connects to a portable fluid pump and fluid reservoir via a flexible hose. In this way, an operator may easily direct a large plume of fluid particles (e.g., droplets including a disinfectant or other chemical) over a wide area.

26 Claims, 4 Drawing Sheets

PORTABLE PARTICLE SPRAYER

CROSS-REFERENCE TO RELATED APPLICATION

The present application for patent claims priority to and the benefit of U.S. Provisional Application No. 63/079,988, titled "PORTABLE MULTI-NOZZLE PARTICLE SPRAYER" filed Sep. 17, 2020, and assigned to the assignee hereof and hereby expressly incorporated by reference herein as if fully set forth below in its entirety and for all applicable purposes.

INTRODUCTION

This patent application relates generally to spraying systems and, more particularly but not exclusively, to a portable particle (e.g., droplet) sprayer.

High-pressure, fluid atomization systems (e.g., fogging systems) have be used for humidification, air cooling, and special effects. Such systems generally include a pump connected to a permanent water source, along with a series of atomization nozzles connected to the pump by permanent feed lines that are attached to a stationary structure (e.g., a building, a structural frame, or a machine). In this way, a steady, reliable fog may be applied at a desired location.

SUMMARY

The following presents a simplified summary of some aspects of the patent application to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

The disclosure relates in some aspects to a portable particle sprayer. In some examples, the particle sprayer may include a relatively small manifold with multiple atomization nozzles (e.g., fog nozzles) that connects to a portable fluid pump and fluid reservoir via a flexible hose. In this way, an operator may easily direct a plume of fluid particles (e.g., droplets) in a desired direction and over a wide area.

In some examples, the particle sprayer is a high-volume small particle sprayer that allows a single operator to cover large surface areas in much less time and/or more effectively than other types of sprayers. For example, the particle sprayer may be a high-volume chemical sprayer used to quickly disinfect large surface areas. As another example, the particle sprayer may be a high-volume chemical sprayer used to apply water, a chemical, or some other soluble material over large surface area (e.g., for an agricultural applications, such as a greenhouse or a plot).

In some applications, (e.g., surface-disinfectant spraying and agricultural uses) it is desirable to create a thin film of liquid that fully coats a surface. This is due to several factors: (1) a thin film is sufficient to provide the desired effect (e.g., disinfect a surface or wet plant surfaces) and does not waste the applied fluid (e.g., a chemical); and (2) a thin film quickly evaporates to dryness, so extra labor is not required to wipe surfaces dry.

Advantageously, a particle sprayer as disclosed herein may produce relatively small droplet sizes. For examples, the particle sprayer may produce an average droplet size on the order of (e.g., within 20% of) 10 microns. Consequently, the particle sprayer may fully wet surfaces with a very thin film of fluid, which may evaporate to dryness after just a few minutes.

In some examples, the particle sprayer may take the form of a portable fogging system where the fog is generated from a water-and-chemical-based fluid. For example, a chemical such as a disinfectant, a fertilizer, a herbicide, a pesticide, a tissue irritant, or some other chemical may be suspended in or otherwise mixed with water or some other fluid and stored in a portable fluid reservoir. A portable pump connected to the fluid reservoir pumps the fluid at a relatively high pressure through a hose to fog nozzles of a spray manifold. Thus, an operator may direct the resulting plume in a desired direction and move the fogging system to different areas to be treated.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
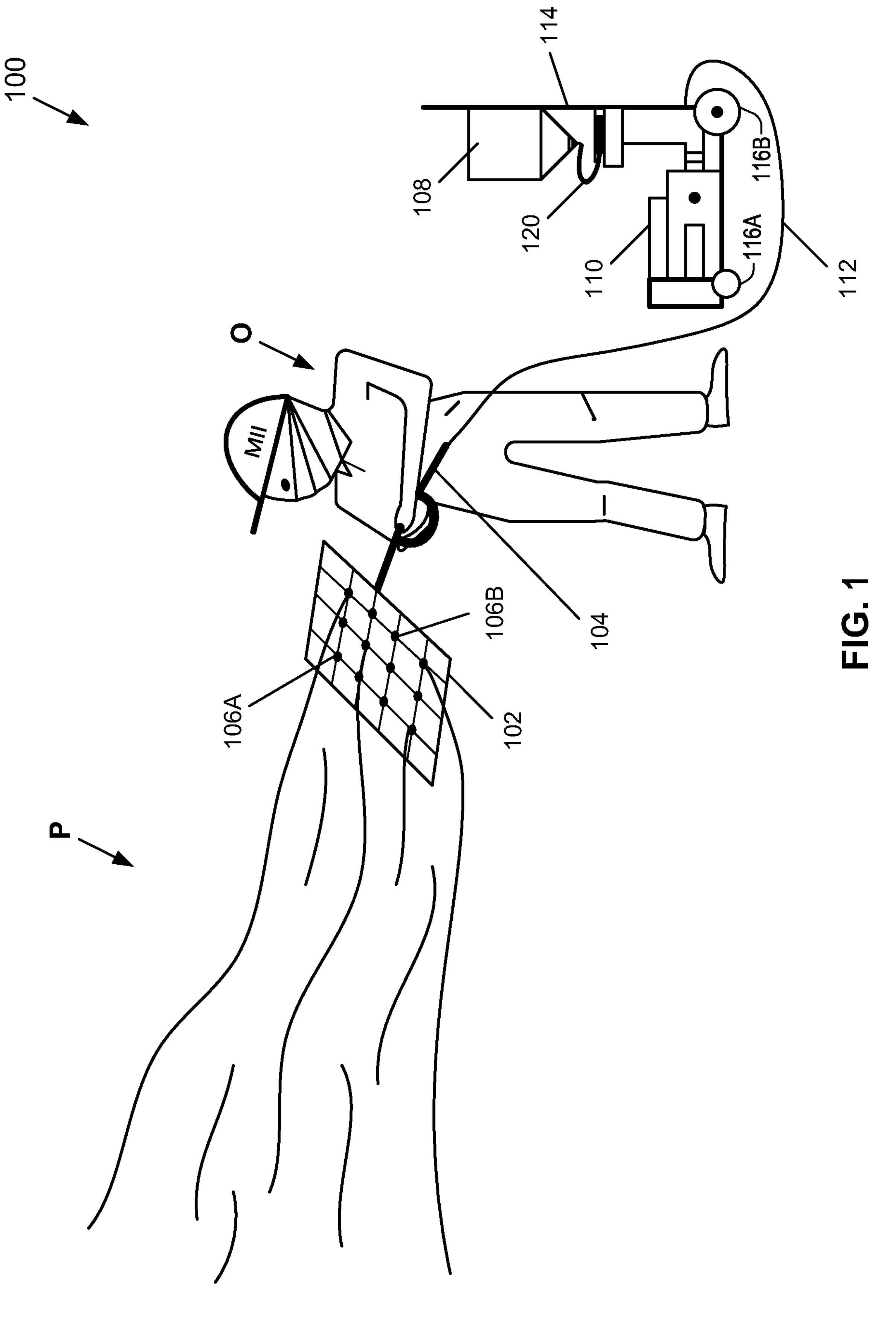
FIG. 1 is a conceptual illustration of a hand-held multi-nozzle particle sprayer including a portable spray manifold and a portable pump system according to some aspects of the disclosure.

FIG. 1 illustrates a portable multi-nozzle particle sprayer 100 where a hand-held spray manifold 102 emits a plume P of small particles (e.g., droplets) under the direction of an operator O. As shown in FIG. 1, a handle 104 is coupled to the spray manifold 102 to enable the operator O to easily direct the plume P.

The spray manifold 102 include several atomization nozzles (e.g., a nozzle 106A and a nozzle 106B) that atomize a fluid from a fluid reservoir (e.g., a suitable fluid containment structure) 108. A pump 110 draws the fluid from the fluid reservoir 108 via a hose 120 and pumps the fluid through a hose 112 that is coupled to the spray manifold 102.

The hose 112 may be coupled to the spray manifold 102 in different ways in different implementations. In some examples (e.g., where the handle 104 does not include a fluid conduit to the spray manifold 102), the hose may be directly coupled to spray manifold 102.

In some examples (e.g., where the handle 104 includes a fluid conduit to the spray manifold 102), the hose may be coupled to the handle 104. In this case, the handle 104 may include a fluid flow control valve 118 (e.g., on-off flow control or variable flow control) that can be manipulated by the operator O for controlling the fluid flow to the spray manifold 102.

In some examples, each of the atomization nozzles (e.g., stainless steel nozzles) has a small diameter orifice and an impaction pin against which a jet of fluid from the orifice impacts. By action of the pump 110, fluid may be introduced through the spray manifold 102 at operating pressures from, for example, several hundred pounds per square inch (psi) to 3,000 psi. The resulting high velocity jet of fluid from the orifice of each nozzle is shattered into a multitude of fine droplets when it encounters the impaction pin, thereby producing droplet of a very small size (e.g., 90% of the droplets are less than 30 microns in diameter). Other nozzle designs may be used in other examples. For example, a nozzle may include an impact plate for atomizing a fluid. As another example, a nozzle may include a flow path that causes a jet of fluid to swirl as it exits the orifice, thereby forming an expanding cone of fluid, which then breaks up into tiny droplets. This latter type of nozzle may be referred to as a “swirl-jet” nozzle.

The multi-nozzle particle sprayer 100 may be used for various types of aqueous applications or other fluid-based applications. As one example, the multi-nozzle particle sprayer 100 may be used to spray a disinfectant on surfaces. The Environmental Protection Agency (EPA) has approved a variety of chemicals for disinfectant spraying (e.g., for disinfecting corona viruses and other uses) that do not require wiping the surface after spraying.

Advantageously, the multi-nozzle particle sprayer 100 allows an operator O to easily and quickly apply a thin film of fluid onto a surface. In some applications, it is desirable to apply a thin film of water to reduce chemical (e.g., disinfectant) usage—by applying enough but not too much chemical. Moreover, a thin film also will not damage electronic or other sensitive equipment. Furthermore, a thin film evaporates to dryness in a matter of a few minutes, thereby saving labor that would otherwise be required to wipe surfaces dry.

The multi-nozzle particle sprayer 100 can create a thin film of water by spraying a high-volume flow of very small droplets (e.g., an average droplet size of approximately 10 microns). In some aspects, this may be achieved using a number of nozzles with relatively small orifices as discussed above. In contrast, using nozzles with larger orifices may require the use of less practical (e.g., impractically high) pump pressures. Moreover, the use of nozzles with larger orifices would produce a spray plume that is too concentrated, and would quickly over-wet surfaces. Thus, the multi-nozzle particle sprayer 100 allows an operator O to apply a thin film of water on surfaces much more effectively (e.g., faster, with less waste, and with less fluid pooling) than other types of sprayers.

Spray nozzles push air when they are in operation. By positioning many nozzles relatively close together, a significant airflow is produced, which results in a relatively long spraying distance. For example, the multi-nozzle particle sprayer 100 may be used to spray surfaces that are up 20 to 30 feet away in some applications, which can significantly reduce labor costs.

Moreover, by using a spray manifold 102 with several nozzles, a larger spray plume may be generated. This larger spray plume allows for faster, more even, coverage. Advantageously, this effect can be achieved using a spray manifold 102 that is still sufficiently small so that an operator may easily manipulate (e.g., move) the spray manifold 102.

FIG. 1 illustrates an example where the pump 110 and the fluid reservoir 108 are implemented on a portable cart 114 (e.g., with wheels 116A and 116B shown in the perspective of FIG. 1). Thus, the operator O may easily move the cart 114 to spray a large area. The pump 110 may be powered by standard 120 Volts AC (VAC) power and/or battery power in some examples.

In another example, a multi-nozzle particle sprayer could be implemented in a backpack-like assembly. For example, a smaller pump 110 and fluid reservoir 108 may be used in this case, where the pump 110 is powered by a battery included in the backpack-like assembly. In this case, one or more straps may be attached to the pump 110 and/or the fluid reservoir 108 and/or a frame for these components to enable the operator O to wear the backpack-like assembly.

In another example, a multi-nozzle particle sprayer with a higher output flow could be mounted to a motorized cart (e.g., an electric cart) for covering (e.g., disinfecting, fertilizing, wetting, etc.) large areas. By using a motorized cart, this implementation may use a larger pump and tank, so more nozzles, higher pressure, higher flow, etc., may be provided. In some examples, such a spray manifold may be 2 to 4 feet in width. In some examples, such a spray manifold may have multiple planar arrays of nozzles, with the arrays pointing in different directions. Also, a fan could be used to blow the fog plume (e.g., a chemical fog plume) even further. Distances of several hundred feet are thus possible. In some examples, the spray manifold could be controlled by a driver when the cart is in motion. In some examples, the driver could stop the cart, get out, and use a spray gun attachment for a spray manifold. Through the use of such a multi-nozzle particle sprayer, a large venue (e.g., a sports arena, etc.) could be disinfected in a matter of minutes, with no need to wipe down surfaces. Since, it would otherwise take many worker hours to wipe down all the seats in a large arena, significant saving in worker time may be achieved. As another example, the cart could be driven around an airport passenger terminal. The lounge for an entire airport gate could be disinfected in a minute or less. An entire terminal could be disinfected in less than an hour.

A multi-nozzle particle sprayer may be used for other applications as well. For example, a multi-nozzle particle sprayer may be used for spraying agricultural chemicals or other chemicals. Again, a fan could be used to increase the spray distance. As another example, a battery powered backpack mounted multi-nozzle particle sprayer could be used to spray pepper spray or similar chemicals for riot control and the like.

Figure 2:
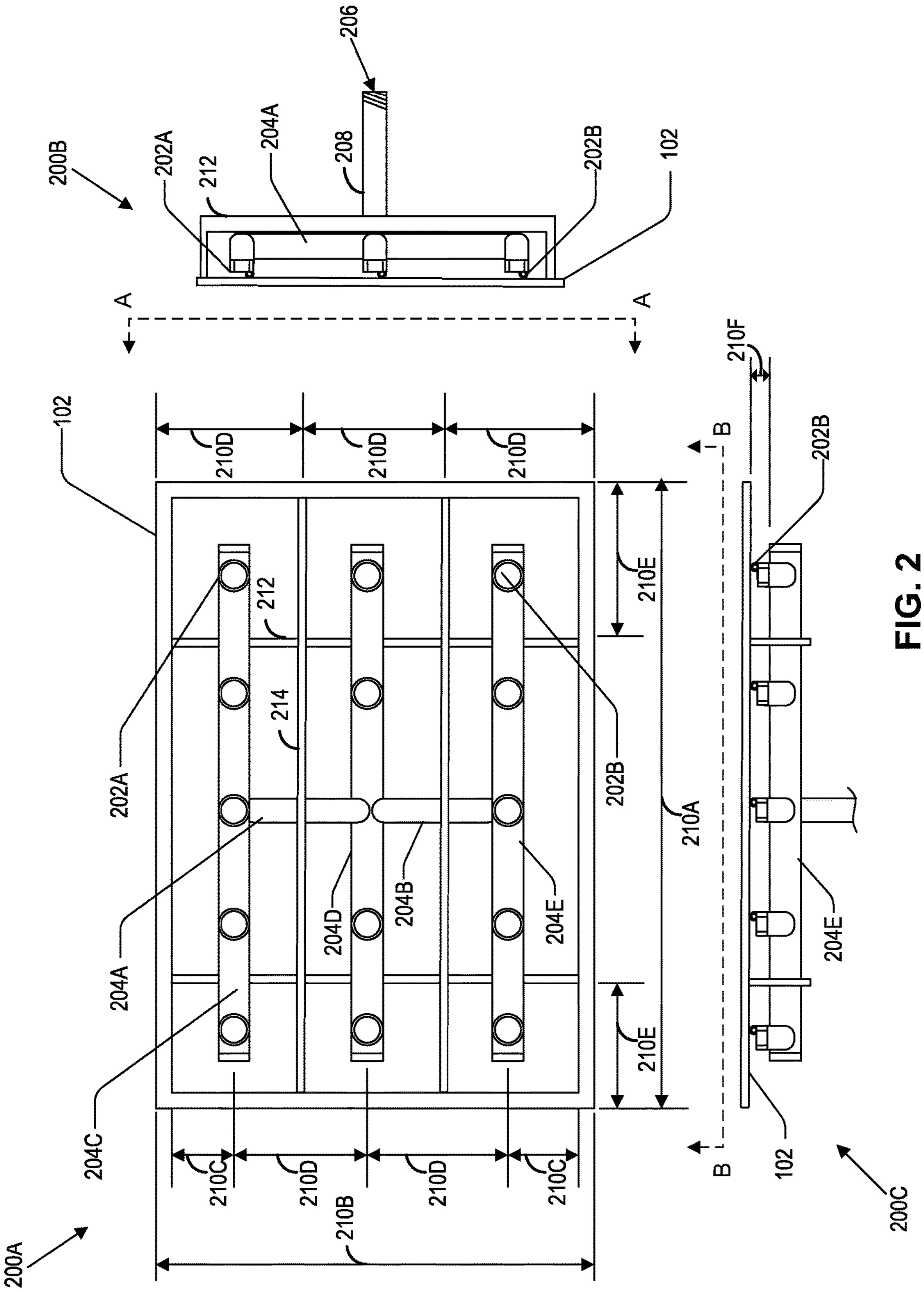
FIG. 2 is a drawing of a portable spray manifold according to some aspects of the disclosure.

FIG. 2 illustrates a more detailed example of the spray manifold 102 of FIG. 1. A first diagram 200A illustrates a planar view of the spray manifold 102. In this view, the nozzles (e.g., nozzles 202A and 202B) would spray out of the page. A second diagram 200B illustrates the spray manifold of the first diagram 200A as seen from the view A-A. In this view, the nozzles would spray to the left. A third diagram 200C illustrates the spray manifold of the first diagram 200A as seen from the view B-B. In this view, the nozzles would spray upwards toward the top of the page.

The spray manifold 102 includes tubing (e.g., tubing sections 204A, 204B, 204C, 204D, and 204D) to carry fluid to the nozzles. One of the sections of the tubing includes an inlet port 206 for receiving fluid from a pump. For example, the port may connect to the hose 112 or the handle 104 of FIG. 1. Fluid entering the inlet port 206 may then flow to the nozzles via a tubing section 208, the tubing section 204D, the tubing sections 204A and 204B, and the tubing sections 204C and 204E. In some implementations, the spray manifold 102 may be constructed from stainless steel tubing. In some implementations, the spray manifold 102 may be constructed with one large head with ports drilled therein to accept several nozzles.

In some examples, the spray manifold 102 has a size of approximately 1 square foot. For example, from the view of the first diagram 200A, the width 210A of the outer frame of the spray manifold 102 may be approximately 12 inches and the height 210B of the outer frame of the spray manifold 102 may be approximately 10 inches. In addition, the distance 210C of the tubing section 204C from the upper side of the outer frame (from the view of the first diagram 200A) may be approximately 1.5 inches. Also, the distance 210D between each of the tubing sections 204C, 204D, and 204E may be approximately 3.5 inches.

The spray manifold may include a first set of support members (e.g., support member 212) and a second set of support members support members (e.g., support member 214) that support the tubing members. In some examples, these support members may be constructed of stainless steel. Other materials may be used in other examples. In the above example where the spray manifold 102 has a size of approximately 1 square foot, the distance 210D of the support member 214 from the upper side of the outer frame of the spray manifold 102 (from the view of the first diagram 200A) may be approximately 3.5 inches. Also, the distance 210E of the support member 212 from the right side of the outer frame (from the view of the first diagram 200A) may be approximately 3 inches. The distance 210F from the top of a tubing member (e.g., the tubing section 204E) to the bottom of the outer frame of the spray manifold may be approximately 1 inch in some examples.

Different sized spray manifolds may be used in other examples. In some implementations (e.g., for non-cart-based applications), spray manifolds may range in size from 16 square inches to 2 square feet. In some implementations (e.g., for cart-based applications), spray manifolds may range in size from 2 square feet to 4 square feet. Other sizes may be used in other examples.

In the example of FIG. 2, the spray manifold includes 14 nozzles. A different number of nozzles may be used in other examples. In some implementations, anywhere from 2 to 20 nozzles may be used. This number of nozzles may be used, for example, for spray manifolds that range in size from 16 square inches to 2 square feet (e.g., from the view of the first diagram 200A). In some implementations, anywhere from 2 to 600 nozzles may be used. This number of nozzles may be used, for example, for spray manifolds that range in size from 2 square feet to 4 square feet (e.g., from the view of the first diagram 200A).

Figure 3:
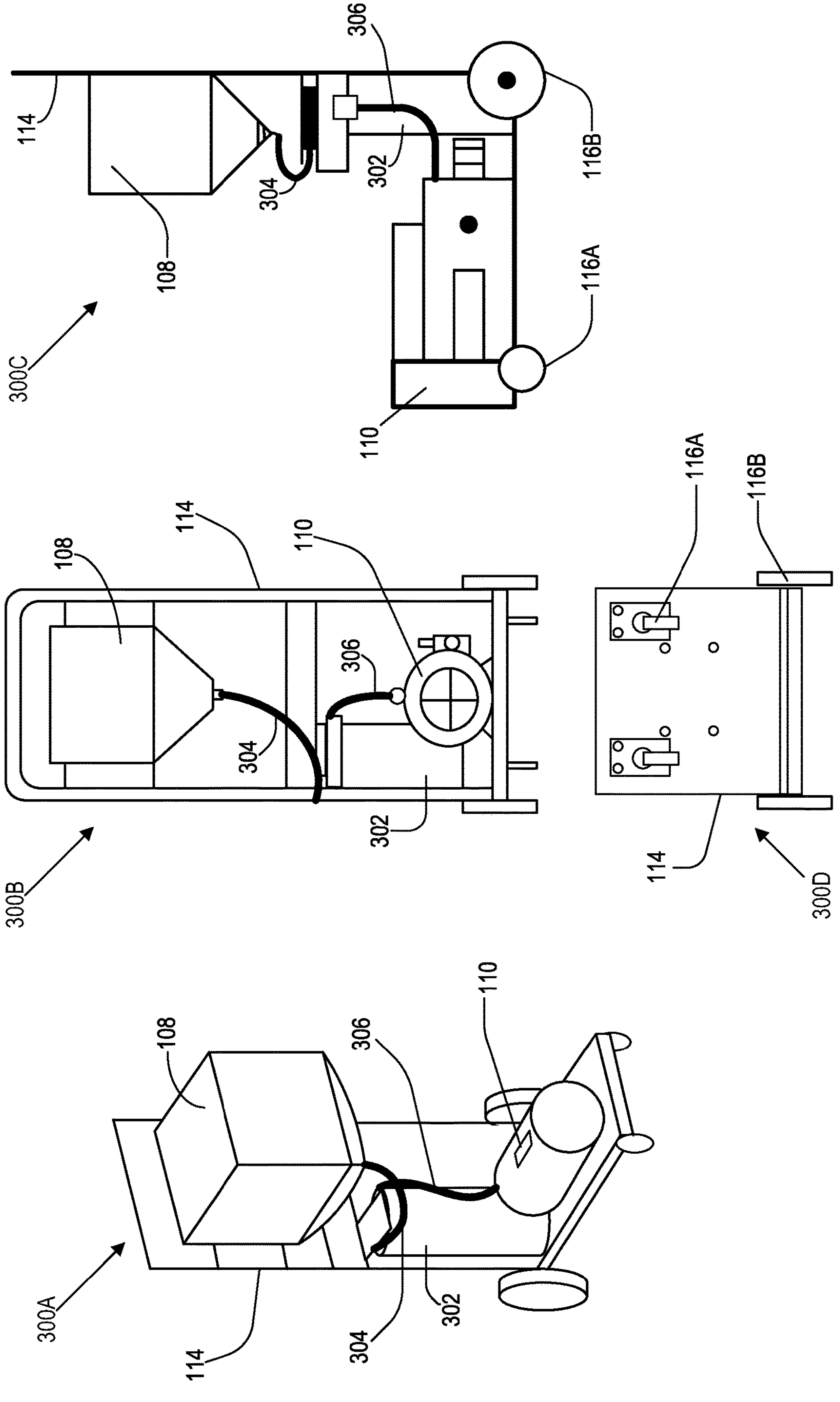
FIG. 3 is a drawing of a portable pump system according to some aspects of the disclosure.

FIG. 3 illustrates the cart 114 of FIG. 1, along with the pump 110, the fluid reservoir 108, and the wheels (e.g., wheels 116A and 116B) in more detail. A first diagram 300A illustrates a perspective view of the cart 114 and associated components. A second diagram 300B illustrates a front view of the cart 114 and associated components. A third diagram 300C illustrates a side view of the cart 114 and associated components. A fourth diagram 300D illustrates a bottom view of the cart 114.

In some examples, the pump 110 may provide a fluid flow on the order of 0.75 gallons per minute (gpm). In some examples, the pump may generate an operating pressure in the range of 500 psi to 3000 psi. In a typical example, the pump may generate 2000 psi which can provide droplets of a sufficiently small size (e.g., droplet sizes less than 20 microns). Advantageously, using 2000 psi and 0.75 gpm may allow the use of a 1 horsepower (hp) motor, which can be plugged into a normal 120 VAC outlet. A larger motor may run on a higher voltage, so it could not be plugged into a typical wall outlet.

In some examples, the pump 110 may be a positive displacement, ceramic plunger pump. Other types of pumps could be used in other examples.

Most high pressure pumps are not self-priming when fed from a tank because the water pressure is not sufficient to push air out of the pump. In some examples, the pump 110 includes a pump primer apparatus. For example, the pump 110 may include a bulb-type pump primer, whereby an operator can squeeze the bulb several times to prime the pump. In some examples, the pump 110 may include a vane type pump on one side of the motor shaft that pushes water to a high pressure pump.

Since the nozzles may have an orifice on the order of 0.006 inches in some examples, the nozzles may plug quickly if used with unfiltered tap water. In some examples, a portable particle sprayer may include a filter 302 (e.g., a 5-micron water filter) upstream of the pump. The filter 302 may be coupled to receive fluid from the fluid reservoir 108 via a hose 304 or some other type of fluid conduit. The filter 302 may be coupled to provide fluid to the pump 110 via a hose 306 or some other type of fluid conduit. A priming pump may be used to push water through the filter 302, which would allow the filter 302 to become more loaded with particulate matter before it would have to replaced.

In some examples, a high pressure gauge (not shown in FIG. 3) is located after the pump 110. This gauge may be used to indicate the pressure that is trapped in the hose 112 (FIG. 1).

Figure 4:
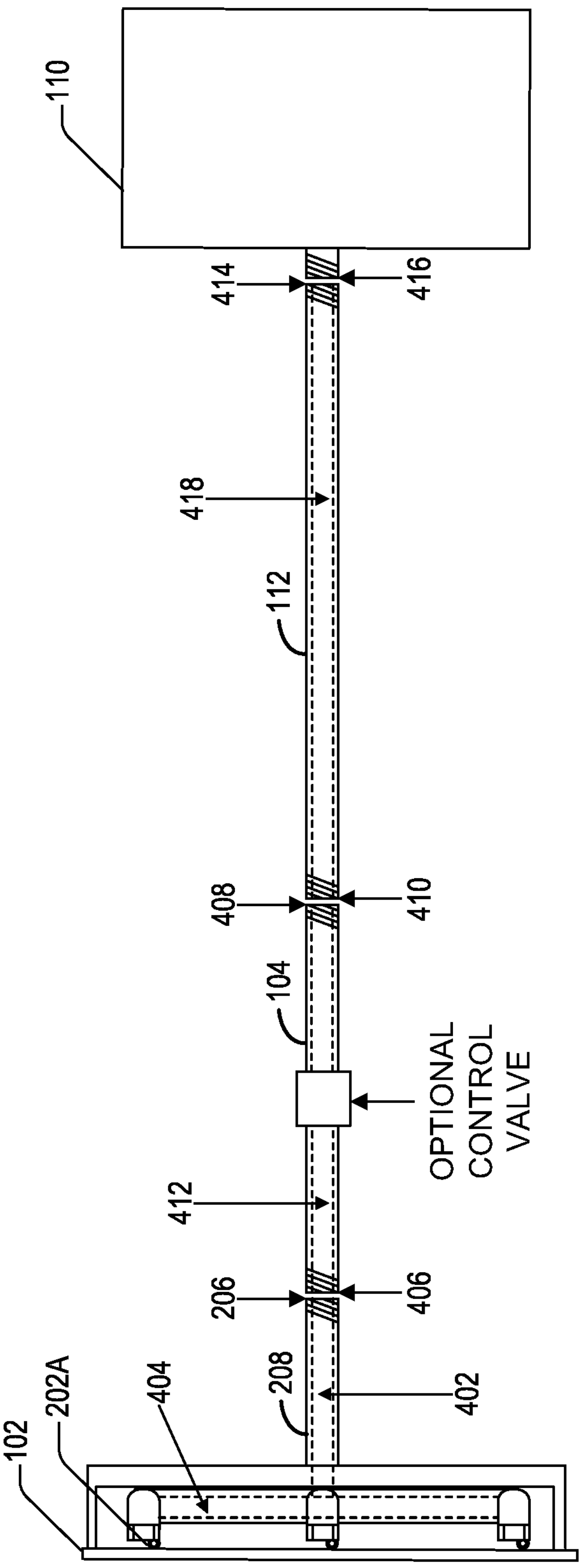
FIG. 4 is a drawing illustrating fluid ports and fluid chambers for conveying a fluid according to some aspects of the disclosure.

FIG. 4 is a drawing illustrating fluid ports and fluid chambers for conveying a fluid according to some aspects of the disclosure. As discussed above, the spray manifold 102 may include an inlet port 106 that conveys fluid to the nozzles (e.g., the nozzle 202A) via fluid chambers (e.g., chambers 402 and 404) in the tubing sections. FIG. 4 also illustrates that in some implementations the handle 104 may include a fluid port 406 that connects to the inlet port 206 and a fluid port 408 that connects to a fluid port 410 of the flexible hose 112. In this case, the handle 104 will include a fluid chamber 412 for conveying fluid from the fluid port 408 to the fluid port 406. The flexible hose 112 also includes a fluid port 414 that connects to a fluid port 416 of the pump 110. In addition, the flexible hose 112 includes a fluid chamber 418 for conveying fluid from the fluid port 414 to the fluid port 410. In examples where the handle does not include a fluid chamber, the fluid port 410 of the flexible hose 112 may connect to the inlet port 206 of the spray manifold 102. In some examples, each fluid port may include a coupling (e.g., a connector) for connecting to another fluid port (e.g., the fluid port 414 may include a coupling for connecting to a coupling of the fluid port 416).

The disclosure relates in some aspects to a portable particle sprayer that includes a spray manifold (e.g., spray manifold 102) including a plurality of nozzles (e.g., nozzles 106A and 106B), a handle (e.g., handle 104) coupled to the spray manifold, a fluid reservoir (e.g., fluid reservoir 108), a pump (e.g., pump 110) coupled to the fluid reservoir to draw a fluid from the fluid reservoir, and a flexible hose (e.g., flexible hose 112) connected to the pump and the spray manifold to convey the fluid from the pump to the nozzles.

The disclosure relates in some aspects to a portable particle sprayer that includes a spray manifold (e.g., spray manifold 102) including a plurality of fog nozzles (e.g., nozzles 106A and 106B), a handle (e.g., handle 104) coupled to the spray manifold, a fluid reservoir (e.g., fluid reservoir 108), a pump (e.g., pump 110) coupled to the fluid reservoir to draw a fluid from the fluid reservoir, and a flexible hose (e.g., flexible hose 112) coupled to the pump and the handle to convey the fluid from the pump to the fog nozzles.

The disclosure relates in some aspects to a portable particle sprayer that includes a manifold (e.g., spray manifold 102) including a plurality of fog nozzles (e.g., nozzles 106A and 106B) and a first fluid port (e.g., port 206), and defining at least one chamber (e.g., within the tubing sections 204A-204E, such as the chambers 402 and 404) coupling the plurality of fog nozzles to the first fluid port, a handle (e.g., handle 104) including a second fluid port (e.g., fluid port 406) and a third fluid port (e.g., fluid port 408), and defining a chamber (e.g., chamber 412) coupling the second fluid port to the third fluid port, wherein the second fluid port is coupled to the first fluid port of the manifold, a fluid reservoir (e.g., fluid reservoir 108), a pump (e.g., pump 110) including a fourth fluid port (e.g., fluid port 416) and coupled to the fluid reservoir to draw a fluid from the fluid reservoir, and a flexible hose (e.g., flexible hose 112) including a first coupling (e.g., for the fluid port 414) and a second coupling (e.g., for the fluid port 410), the first coupling connected to the fourth fluid port of the pump and the second coupling coupled to the third fluid port of the handle to convey the fluid from the pump to the fog nozzles.

In some examples, a size of a planar surface of the spray manifold (e.g., the view of the first diagram 200A) is less than or equal to 1 square foot. In some examples, the plurality of nozzles is 2 nozzles to 20 nozzles.

In some examples, a size of a planar surface of the spray manifold is between 16 square inches and 4.0 square feet. In some examples, the plurality of nozzles is 2 nozzles to 20 nozzles.

In some examples, a size of a planar surface of the spray manifold is between 2.0 square foot and 4.0 square feet. In some examples, the plurality of nozzles is 2 nozzles to 600 nozzles.

In some examples, the spray manifold comprises a first planar surface with a first array of the plurality of nozzles and at least one second planar surface with at least one second array of the plurality of nozzles.

In some examples, the pump generates a fluid pressure between 500 pounds per square inch (psi) and 3000 psi. In some examples, the pump generates a fluid flow of between 0.25 gallons per minute (gpm) and 1.0 gpm. In some examples, the pump comprises a motor rated at 1.0 horsepower or lower than 1.0 horsepower. In some examples, the pump comprises a motor that operates at 120 VAC. In some examples, the pump comprises a primer apparatus. In some examples, the pump comprises a fluid filter with a pore size less than or equal to 5.0 microns.

In some examples, the fluid comprises a disinfectant. In some examples, the fluid comprises a fertilizer. In some examples, the fluid comprises a pesticide. In some examples, the fluid comprises a herbicide. In some examples, the fluid comprises a tissue irritant.

In some examples, the portable particle sprayer further comprises at least one strap attached to the pump and/or the fluid reservoir for carrying the pump and the fluid reservoir on a back of an operator. In some examples, the portable particle sprayer further comprises a fan coupled to the spray manifold.

In some examples, the flexible hose comprises rubber or polyurethane. In some examples, the fluid reservoir comprises (e.g., includes or is coupled to) a fluid filter with a pore size less than or equal to 5.0 microns.

In some examples, the handle comprises a valve to control a flow rate of the fluid to the nozzles. In some examples, the handle comprises an on-off value to control flow of the fluid to the nozzles.

In some examples, the plurality of nozzles generate fluid droplets with an average diameter on the order of 10 microns. In some examples, the plurality of nozzles generate fluid droplets where 90% of the fluid droplets have a diameter of less than or equal to 30 microns. In some examples, each of the nozzles has an orifice and an impaction pin. In some examples, each orifice has a diameter between 0.003 inch and 0.010 inch. In some examples, each of the nozzles comprises a swirl shaped structure.

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented using any number of the aspects set forth herein. In addition, such an apparatus may be implemented may be practiced using other structure and functionality in addition to or other than one or more of the aspects set forth herein.

One or more of the components, features and/or functions illustrated in above may be rearranged and/or combined into a single component, feature or function or embodied in several components, steps, or functions. Additional elements, components, and/or functions may also be added without departing from novel features disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "one or more of a, b, or c" used in the description or the claims means "a or b or c or any combination of these elements." For example, this terminology may include a, or b, or c, or a and b, or a and c, or a and b and c, or 2_a_, or 2_b_, or 2_c_, or 2_a_ and _b_, and so on.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A portable particle sprayer, comprising:

a spray manifold comprising a plurality of spaced-apart tubing sections and a plurality of fog nozzles, wherein a first subset of the plurality of fog nozzles is located on a first tubing section of the plurality of spaced-apart tubing sections, wherein at least a second subset of the plurality of fog nozzles is located on at least a second tubing section of the plurality of spaced-apart tubing sections, wherein the plurality of fog nozzles is at least 8 fog nozzles, and wherein a planar area of the spray manifold is greater than 16 square inches;

a handle coupled to the spray manifold;

a fluid reservoir;

a pump coupled to the fluid reservoir to draw a fluid from the fluid reservoir; and a flexible hose connected to the pump and the spray manifold to convey the fluid from the pump to the plurality of fog nozzles, wherein:

each of the plurality of fog nozzles has an impaction pin and an orifice with a diameter between 0.003 inch and 0.010 inch to collectively generate droplets from the fluid conveyed to the plurality of fog nozzles such that 90% of the droplets have a diameter of less than or equal to 30 microns.

2. The portable particle sprayer of claim 1, wherein a size of the planar area of the spray manifold is less than or equal to 1 square foot.

3. The portable particle sprayer of claim 2, wherein the plurality of fog nozzles is at least 20 nozzles.

4. The portable particle sprayer of claim 1, wherein a size of the planar area of the spray manifold is less than or equal to 2.0 square feet.

5. The portable particle sprayer of claim 4, wherein the plurality of fog nozzles is at least 20 fog nozzles.

6. The portable particle sprayer of claim 1, wherein a size of the planar area of the spray manifold is between 2.0 square foot and 4.0 square feet.

7. The portable particle sprayer of claim 6, wherein the plurality of fog nozzles is 16 fog nozzles to 600 fog nozzles.

8. The portable particle sprayer of claim 1, wherein;

the first subset of the plurality of fog nozzles and the second subset of the plurality of fog nozzles collectively comprise a first planar array of fog nozzles associated with the planar area and pointing in a first direction; and the spray manifold further comprises a second planar array of fog nozzles pointing in a second direction that is different from the first direction.

9. The portable particle sprayer of claim 1, wherein the pump generates a fluid pressure between 500 pounds per square inch (psi) and 3000 psi.

10. The portable particle sprayer of claim 1, wherein the pump generates a fluid flow of between 0.25 gallons per minute (gpm) and 1.0 gpm.

11. The portable particle sprayer of claim 1, wherein the pump comprises a motor rated at 1.0 horsepower or lower than 1.0 horsepower.

12. The portable particle sprayer of claim 1, wherein the pump comprises a motor that operates at 120 VAC.

13. The portable particle sprayer of claim 1, wherein the pump comprises a primer apparatus.

14. The portable particle sprayer of claim 1, wherein the pump comprises a fluid filter with a pore size less than or equal to 5.0 microns.

15. The portable particle sprayer of claim 1, wherein the fluid comprises a disinfectant, a fertilizer, a pesticide, a herbicide, or a tissue irritant.

16. The portable particle sprayer of claim 1, wherein the flexible hose comprises rubber or polyurethane.

17. The portable particle sprayer of claim 1, wherein the handle comprises a valve to control a flow rate of the fluid to the plurality of fog nozzles.

18. The portable particle sprayer of claim 1, wherein the handle comprises an on-off valve to control flow of the fluid to the plurality of fog nozzles.

19. The portable particle sprayer of claim 1, wherein the fluid reservoir comprises a fluid filter with a pore size less than or equal to 5.0 microns.

20. The portable particle sprayer of claim 1, wherein the plurality of fog nozzles generate fluid droplets with an average diameter on the order of 10 microns.

21. The portable particle sprayer of claim 1, wherein:

the plurality of spaced-apart tubing sections and the plurality of fog nozzles form a two-dimensional array on the spray manifold; and each orifice of each of the plurality of fog nozzles is oriented in the same direction.

22. The portable particle sprayer of claim 1, wherein a density of the plurality of fog nozzles within the planar area of the spray manifold is at least one fog nozzle per 9 square inches.

23. A portable particle sprayer, comprising:

a spray manifold comprising a plurality of spaced-apart tubing sections and a plurality of fog nozzles, wherein a first subset of the plurality of fog nozzles is located on a first tubing section of the plurality of spaced-apart tubing sections, wherein at least a second subset of the plurality of fog nozzles is located on at least a second tubing section of the plurality of spaced-apart tubing sections, wherein the plurality of fog nozzles is at least 8 fog nozzles, and wherein a planar area of the spray manifold is greater than 16 square inches;

a handle coupled to the spray manifold;

a fluid reservoir;

a pump coupled to the fluid reservoir to draw a fluid from the fluid reservoir; and a flexible hose coupled to the pump and the handle to convey the fluid from the pump to the plurality of fog nozzles, wherein:

each of the plurality of fog nozzles has an impaction pin and an orifice with a diameter between 0.003 inch and 0.010 inch to collectively generate droplets from the fluid conveyed to the plurality of fog nozzles such that 90% of the droplets have a diameter of less than or equal to 30 microns.

24. The portable particle sprayer of claim 23, wherein:

the plurality of spaced-apart tubing sections and the plurality of fog nozzles form a two-dimensional array on the spray manifold; and each orifice of each of the plurality of fog nozzles is oriented in the same direction.

25. A portable particle sprayer, comprising:

a manifold comprising a plurality of spaced-apart tubing sections, a plurality of fog nozzles, and a first fluid port, and defining at least one chamber coupling the plurality of fog nozzles to the first fluid port, wherein a first subset of the plurality of fog nozzles is located on a first tubing section of the plurality of spaced-apart tubing sections, wherein at least a second subset of the plurality of fog nozzles is located on at least a second tubing section of the plurality of spaced-apart tubing sections, wherein the plurality of fog nozzles is at least 8 fog nozzles, and wherein a planar area of the manifold is greater than 16 square inches;

a handle comprising a second fluid port and a third fluid port, and defining a chamber coupling the second fluid port to the third fluid port, wherein the second fluid port is coupled to the first fluid port of the manifold;

a fluid reservoir;

a pump comprising a fourth fluid port and coupled to the fluid reservoir to draw a fluid from the fluid reservoir; and a flexible hose comprising a first coupling and a second coupling, the first coupling connected to the fourth fluid port of the pump and the second coupling coupled to the third fluid port of the handle to convey the fluid from the pump to the plurality of fog nozzles, wherein:

each of the plurality of fog nozzles has an impaction pin and an orifice with a diameter between 0.003 inch and 0.010 inch to collectively generate droplets from the fluid conveyed to the plurality of fog nozzles such that 90% of the droplets have a diameter of less than or equal to 30 microns.

26. The portable particle sprayer of claim 25, wherein:

the plurality of spaced-apart tubing sections and the plurality of fog nozzles form a two-dimensional array on the manifold; and each orifice of each of the plurality of fog nozzles is oriented in the same direction.

* * * * *